United States Patent
Fassnacht

(10) Patent No.: US 9,475,437 B2
(45) Date of Patent: Oct. 25, 2016

(54) SYSTEM AND METHOD FOR HIGH-VOLTAGE DISCONNECTION IN A VEHICLE

(75) Inventor: Jochen Fassnacht, Calw (DE)

(73) Assignee: Robert Bosch GmbH, Stuttgart (DE)

( * ) Notice: Subject to any disclaimer, the term of this patent is extended or adjusted under 35 U.S.C. 154(b) by 560 days.

(21) Appl. No.: 13/981,443

(22) PCT Filed: Dec. 13, 2011

(86) PCT No.: PCT/EP2011/072567
§ 371 (c)(1),
(2), (4) Date: Jul. 24, 2013

(87) PCT Pub. No.: WO2012/100877
PCT Pub. Date: Aug. 2, 2012

(65) Prior Publication Data
US 2013/0307326 A1    Nov. 21, 2013

(30) Foreign Application Priority Data
Jan. 25, 2011 (DE) .................. 10 2011 003 082

(51) Int. Cl.
| | |
|---|---|
| *B60L 3/00* | (2006.01) |
| *B60L 3/02* | (2006.01) |
| *B60R 16/02* | (2006.01) |
| *B60L 3/04* | (2006.01) |
| *B60R 21/01* | (2006.01) |

(52) U.S. Cl.
CPC .............. *B60R 16/02* (2013.01); *B60L 3/0069* (2013.01); *B60L 3/04* (2013.01); *B60R 2021/01252* (2013.01)

(58) Field of Classification Search
CPC ......... B60L 1/003; B60L 3/0069; B60L 3/04
USPC ................................................. 307/9.1, 10.1
See application file for complete search history.

(56) References Cited

U.S. PATENT DOCUMENTS

| 7,402,068 B1 | 7/2008 | Tarchinski |
| 2011/0037317 A1* | 2/2011 | Kuschnarew ....... B60L 11/1887 307/9.1 |

FOREIGN PATENT DOCUMENTS

| DE | 10102242 | 7/2002 |
| EP | 1351107 | 10/2003 |
| WO | 2009/112165 | 9/2009 |

OTHER PUBLICATIONS

International Search Report for Application No. PCT/EP2011/072567 dated Dec. 13, 2012 (3 pages).

*Primary Examiner* — Jung Kim
*Assistant Examiner* — James P Evans
(74) *Attorney, Agent, or Firm* — Michael Best & Friedrich LLP

(57) ABSTRACT

The invention relates to a system (2) for high-voltage disconnection in a vehicle having at least two high-voltage carrying components (10, 12*a, b,* 14, 16, 18, 20), each component having a housing (11), at least one connecting element for a data bus (4) and at least one connecting element for a high-voltage supply (9), each high-voltage carrying component (10, 12*a, b,* 14, 16, 18, 20) being designed to detect locally an event which is intended to trigger a high-voltage disconnection, wherein said system is characterized in that each high-voltage carrying component (10, 12*a, b,* 14, 16, 18, 20) is designed locally to trigger a high-voltage disconnection of the high-voltage carrying component (10, 12*a, b,* 14, 16, 18, 20) as a reaction to the detection of the event. As an advantageous development, access to components having a hazardous voltage is possible only after the connecting element of the data bus has been removed, the removal or disruption of which leads to rapid disconnection of the electric system.

17 Claims, 5 Drawing Sheets

SYSTEM AND METHOD FOR HIGH-VOLTAGE DISCONNECTION IN A VEHICLE

BACKGROUND OF THE INVENTION

The present invention relates to the vehicle sector, in particular for hybrid and electric vehicles. The present invention particularly relates to the disconnection of a high-voltage in a vehicle during servicing and/or in the event of a fault.

Electrical components of a hybrid or electric vehicle are usually operated at voltages which are dangerous to people. To prevent a voltage of this kind from endangering the health or the life of a person, it is necessary to ensure that said voltage is not transmitted to live components of the vehicle or exposed to open access during servicing or in the event of a fault, and as a result does not present a potential hazard.

To this end, conventional hybrid and electric vehicles have substantially encapsulated components by which direct access to voltage-carrying parts from outside is prevented. However, in the event of a fault or during servicing, it may be necessary to release high-voltage cabling arrangements between the components or to open the housings thereof. In the event of an accident, intervention of this kind may be forced from the outside.

In a case of this kind in which the integrity of the high-voltage circuit or its insulating insulation means is no longer ensured, care must be taken that high-voltage-carrying components are not exposed in such a way that unprotected access from the outside is possible.

As a result, contact elements, which detect disconnection of the high-voltage cabling or of the housing and trigger high-voltage disconnection of the entire system in response, are used locally on the housings or plug elements of the electrical circuit of the high-voltage-carrying components.

A corresponding measure can be seen in a so-called high-voltage interlock, in other words disconnection of the hazardous voltage in high-voltage-carrying components if protective covers are removed or high-voltage-carrying plug connections are disconnected.

A functionality of this kind can conventionally be realized by what is known as a pilot line or high-voltage interlock line which is interrupted as soon as a plug or cover of high-voltage-carrying components is opened or released and therefore would expose a dangerous voltage.

In this case, the pilot line can be in the form of a serial contact interconnection and connected to a central evaluation element or an evaluation circuit. The serial interconnection of the contact elements to all high-voltage-carrying components of a vehicle has to ensure, in particular, that single component-independent opening or disconnection of a high-voltage-carrying element is sufficient to deactivate the entire system.

An associated evaluation circuit can be arranged, for example, in a pulse-controlled inverter or in the battery and can furthermore transmit a disconnection instruction to the remaining components of the system via a system bus or communication bus, for example a CAN bus.

By way of example, all sources which feed the intermediate circuit can be disconnected, the electrical drive can be disconnected and all relevant energy storage means can be discharged as system responses when the pilot line is open. Sources can be disconnected, for example, by opening the battery contactor, electrical drives can be disconnected by opening a clutch and stopping the drive or by active short-circuiting.

However, central disconnection of this kind is very complicated and costly since additional outlay on cabling, and plugs and contacts and a central evaluation circuit are required. In particular, an individual pilot line has to be serially routed through all of the high-voltage-carrying components in order to ensure reliable disconnection in the event of a fault and/or during servicing. However, a corresponding individual, serial pilot line can also be considered to be susceptible to faults.

SUMMARY OF THE INVENTION

One aspect of the present invention is the decentralization of the functionality of a pilot line. Instead of providing a central evaluation unit which detects the opening of each contact, detection is instead provided in a decentralized manner and therefore locally in each high-voltage-carrying component.

This means it is firstly possible to avoid complete, serial cabling of all the high-voltage-carrying components with a single pilot line. Corresponding decentralization of the pilot line can save costs by a contact element being arranged in or on the housing of a high-voltage-carrying component and said high-voltage-carrying component having a decentralized evaluation circuit. Detected opening of a housing or disconnection of a connection element with a hazardous voltage can be forwarded to the further high-voltage-carrying components and additional relevant components by means of a system bus or data bus, for example by the CAN bus.

In this case, cable connections for this decentral pilot line can be arranged in the housing of the high-voltage-carrying component or simple contact bridges can be used in the plugs or the housing, said contact bridges responding in such a way that they interrupt a contact when the housing is opened or a plug is disconnected.

In respect of high-voltage-protection, the present invention provides the same functionality as a central pilot line, but without the additional cabling exhibited by said pilot line.

Instead of a central cable which is looped through all the components and is evaluated centrally, decentral evaluation is provided in each high-voltage-carrying component. Disconnection or rapid discharging of the high-voltage system can be requested by means of the CAN bus or another suitable data bus.

A further event which is intended to trigger high-voltage disconnection can be, for example, unplugging of a plug contact or opening of a housing, or generally an event which would reduce the electric-shock protection of a high-voltage-carrying component, and a response of the system for disconnecting all the high-voltage-carrying components is then triggered in the vehicle.

When the data bus for communicating with the high-voltage loads is interrupted, rapid discharge and active short-circuiting of the pulse-controlled inverter have to be carried out after a defined short latency time since safety-relevant messages can no longer be sent on account of the lack of communication.

Therefore, triggering of a system reaction for rapidly disconnecting all the high-voltage-carrying components can also be performed directly by the data bus.

A corresponding data bus could, for example, be designed to detect disconnection of a connection element of the data bus from a component, and to display this as a disturbance or breakdown of the bus. Detection of this kind, for example in the CAN bus, is performed automatically, for reasons of safety. Therefore, the decentral functionality of the pilot line can also be implemented by substantially detecting whether a connection element of a data bus is unplugged from a component, for example a high-voltage-carrying component.

This can furthermore be supplemented by, for example, the pulse-controlled inverter, the battery, the charging device or a DC voltage converter or a DC/DC converter being able to be opened or a high-voltage connection being able to be unplugged or opened only when the plug of the CAN bus, or its connection element, which is associated with the respective high-voltage-carrying component has first been previously removed or disconnected.

In other words, the connection element of the CAN bus on a high-voltage-carrying component is that element which first has to be removed or unplugged in the event of removal, opening or unplugging of the respective component from the system or from the vehicle. Therefore, the electric-shock protection can be reduced only when the connection element of the data bus has been removed from the housing. In this case, this removal process corresponds to deliberate production of a fault in the knowledge that this disturbance will necessarily produce high-voltage disconnection on account of the automatic response of the data bus.

In this case, suitable design measures are intended to prevent this first unplugging requirement from being able to be bypassed, so that the electric-shock protection cannot be reduced without removing the connection element of the data bus. For example, mechanical elements, for example coupled to the connection element of the data bus, can prevent further connection elements, for example the high-voltage lines, from being unplugged or the housing from being opened.

If an interruption of this kind or unplugging of a component of this kind is now identified in the CAN bus or in the data bus, this has to trigger the system response of rapid disconnection of the hazardous voltage in the entire system. Both electric-shock protection and also arc protection can be realized with a functionality of this kind However, a functionality of this kind may require the corresponding high-voltage-carrying component to have a certain inherent intelligence (control device) and/or to be equipped with a system bus or data bus connection.

It is therefore necessary to ensure that a housing of a high-voltage-carrying component or a connection element of the high-voltage supply of the battery, pulse-controlled inverter, charging device and/or DC/DC converter is formed in such a way that the bus plug first has to be unplugged before the housing can be opened or a high-voltage connection element can be withdrawn.

In this context, a reduction in the electric-shock protection is understood to be any non-destructive measures which can increase the possibility of access to high-voltage-carrying parts of a high-voltage-carrying component, for example opening of the housing, removal of a cover or unplugging of high-voltage-carrying lines.

An electrical machine which possibly may not have a control device or which does not represent an intelligent component has to be protected by inaccessible installation or by fixed mounting of the high-voltage-carrying cables or only by destructive access to the high-voltage connection elements or the protective cover or the housing, for example by rivets. Comparable measures can also be provided for an on-board electrical system distributor. However, this can also be integrated in a high-voltage-carrying component, for example in the pulse-controlled inverter, and therefore be monitored via its bus line or bus connection element.

As an alternative, components which themselves do not need to be connected to a data bus, for example the electrical machine or the on-board electrical system distributor, can be protected by the data bus nevertheless being looped through the corresponding components and therefore a plug connection first having to be disconnected before the housing can be opened or a cover or plug can be removed.

In the case of a charging device, for example a potential-disconnected charging device without an energy feed option, which may possibly be provided in the vehicle, the housing can also be formed in such a way that it can be opened only when both the bus connection plug and the control pilot plug or the mains plug have been released or disconnected from the housing.

If the intention is for the connection element of the data bus to take on the functionality of the pilot line, the housing can have special design measures, for example additional covers or clips which can be removed only when the connection element of a data bus has been unplugged or disconnected.

When it is detected that the integrity of the data bus has been damaged, all feed sources in the intermediate circuit, for example battery, electric drives and charging device, are to be disconnected and all energy storage means are to be immediately discharged as a system response to the high voltage being disconnected. It is particularly advantageous for a disturbed bus to therefore deactivate the entire high-voltage circuit or the entire high-voltage system or, as a result, for a high-voltage-carrying component to automatically carry out emergency disconnection.

High-voltage connection elements should nevertheless be designed to be electric-shock-protected in line with specification IPXXB in the unplugged state.

More simple central pilot line cabling or high-voltage interlock cabling, or the omission thereof, can lead to a reduction in costs. A higher availability of the entire system results particularly in the case of securing by means of the data bus since a component which has to lead to disconnection of the overall system in the event of a malfunction so as to be fail-safe is omitted. In the case of decentral detection, a plurality of decentral evaluation circuits may be required, which, however, may possibly be designed in a simple and favorable manner, particularly if a digital processor input is provided. In this case, cabling costs for the interlock line through the entire vehicle are dispensed with.

Furthermore, it is possible, for example, to transmit a periodic signal, for example a "high-voltage interlock closed" signal, by means of the data bus in order to increase the functional reliability. In the event of this signal no longer being transmitted/received or being transmitted or received more regularly, high-voltage disconnection of the system is triggered as a system response.

BRIEF DESCRIPTION OF THE DRAWINGS

Exemplary embodiments of the invention are illustrated in the drawings and explained in greater detail in the following description.

DETAILED DESCRIPTION

Figure 1:
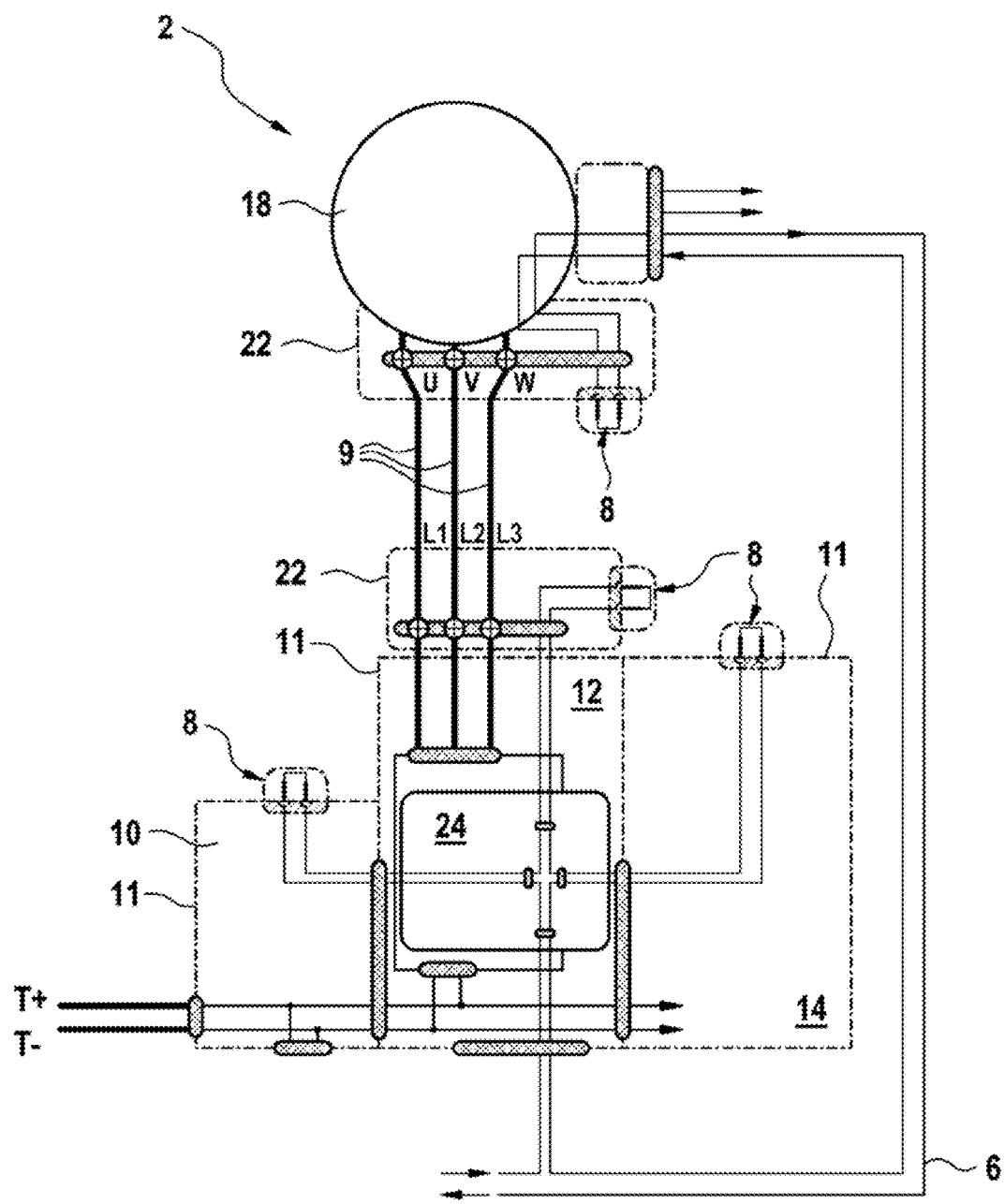
FIG. 1 shows an exemplary refinement of a high-voltage system with disconnection by a central pilot line.

FIG. 1 shows an exemplary refinement of a high-voltage system with disconnection by a central pilot line.

FIG. 1 shows an exemplary high-voltage system 2 of a motor vehicle comprising the components of a distributor box 10, a pulse-controlled inverter 12, a DC voltage converter 14 or DC/DC converter 14, and an electrical machine 18.

The electrical machine 18 is connected to the pulse-controlled inverter 12 using high-voltage lines 9.

In FIG. 1, dashed lines represent, in particular, a housing 11, for example a high-voltage protection housing, of the respective component, or else, for example in the case of the high-voltage line 9, covers 22 for the power connections of the electrical machine 18 or of the pulse-controlled inverter 12.

Detection contacts 8 which are connected in series by a pilot line 6 are fitted at suitable points of the housing or of the covers 22. The serial interconnection of the detection contacts 8 makes it possible to detect opening of an individual detection contact 8 using only one pilot line 6. A central evaluation circuit 24 is provided in the pulse-controlled inverter 12 by way of example in FIG. 1.

If one of the detection contacts 8 is now opened, opening of this kind can be detected using the central pilot line 6 and the evaluation circuit 24, as a result of which high-voltage disconnection of the entire system 2 can be triggered starting from the evaluation circuit 24 and furthermore, by way of example, from the pulse-controlled inverter 12. Corresponding disconnection can be performed, for example, using a data bus 4 (not illustrated in FIG. 1).

The hazardous voltage can be fed via the connections T+ and T− of FIG. 1.

Figure 2:
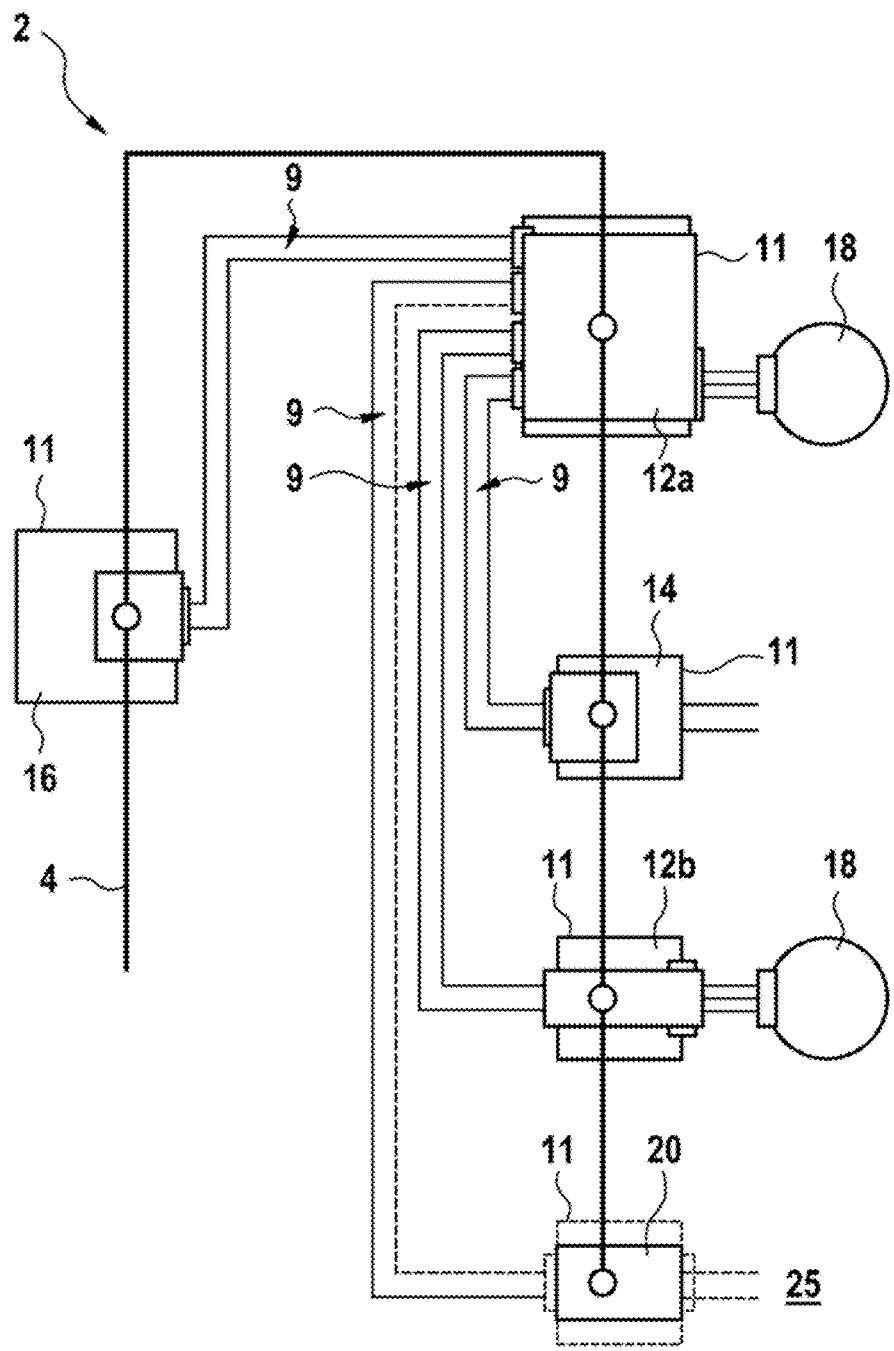
FIG. 2 shows an exemplary embodiment of the high-voltage system according to the present invention.

An exemplary embodiment of the high-voltage system according to the present invention is illustrated with further reference to FIG. 2.

FIG. 2 illustrates a system 2 of the present invention which provides a function of the central pilot line 6 using the data bus 4 or system bus 4.

A battery 16, a pulse-controlled inverter 12a which is connected to an electrical machine 18, a DC/DC converter 14 which is connected to the 12 V on-board electrical system of the vehicle, a climate pulse-controlled inverter 12b with a downstream electrical machine 18, and a charging device 20 which can be connected, for example, to the public electricity supply system 25 are arranged in an exemplary manner in FIG. 2.

High-voltage lines 9 to the individual components battery 16, DC/DC converter 14, climate pulse-controlled inverter 12b and charging device 20 are illustrated starting from the pulse-controlled inverter 12a. As part of the system 2 according to FIG. 2, it is now necessary to ensure that system disconnection of the hazardous voltage is triggered in the event of a housing 11 being opened or a high-voltage conductor 9 being removed.

The data bus 4 is connected to the individual components only schematically in FIG. 2, without any detail being provided about the explicit implementation of the plugs or connection elements or the mechanics thereof.

However, a refinement of the plug elements of the data bus 4, the housing 11 and the connection elements of the high-voltage line 9 in such a way that a housing 11 is first opened and a high-voltage line 9 can be disconnected from a component only when the connection element of the data bus 4 has been removed or unplugged from the respective component 12a, 12b, 14, 16, 20 and possibly 18 is particularly preferred.

Disconnection of a data bus connection element can be identified on account of the resulting disturbance or the resulting breakdown of the data bus, and this is followed by the immediate high-voltage disconnection of the system 2.

In the case of components 12a, 12b, 14 and 16, it is necessary for it to be possible for the housing or to first be opened or for the high-voltage plug to first be unplugged when the bus plug has been removed. In the case of the charging device 20, it is further necessary for removal of the mains plug or control pilot to be a precondition for being able to open the housing or unplug the high-voltage line 9.

In the case of the respective electrical machine 18 being connected to the pulse-controlled inverters 12a, b, it was necessary for the plugs either to be secured by installation or riveted, and therefore to be able to be opened only such that it is destroyed, and for it to be possible to open the housing of the machine only when the plug has been removed. The housing of an electrical machine 18 should likewise be designed in such a way that it can be opened only such that it is destroyed.

Figure 3:
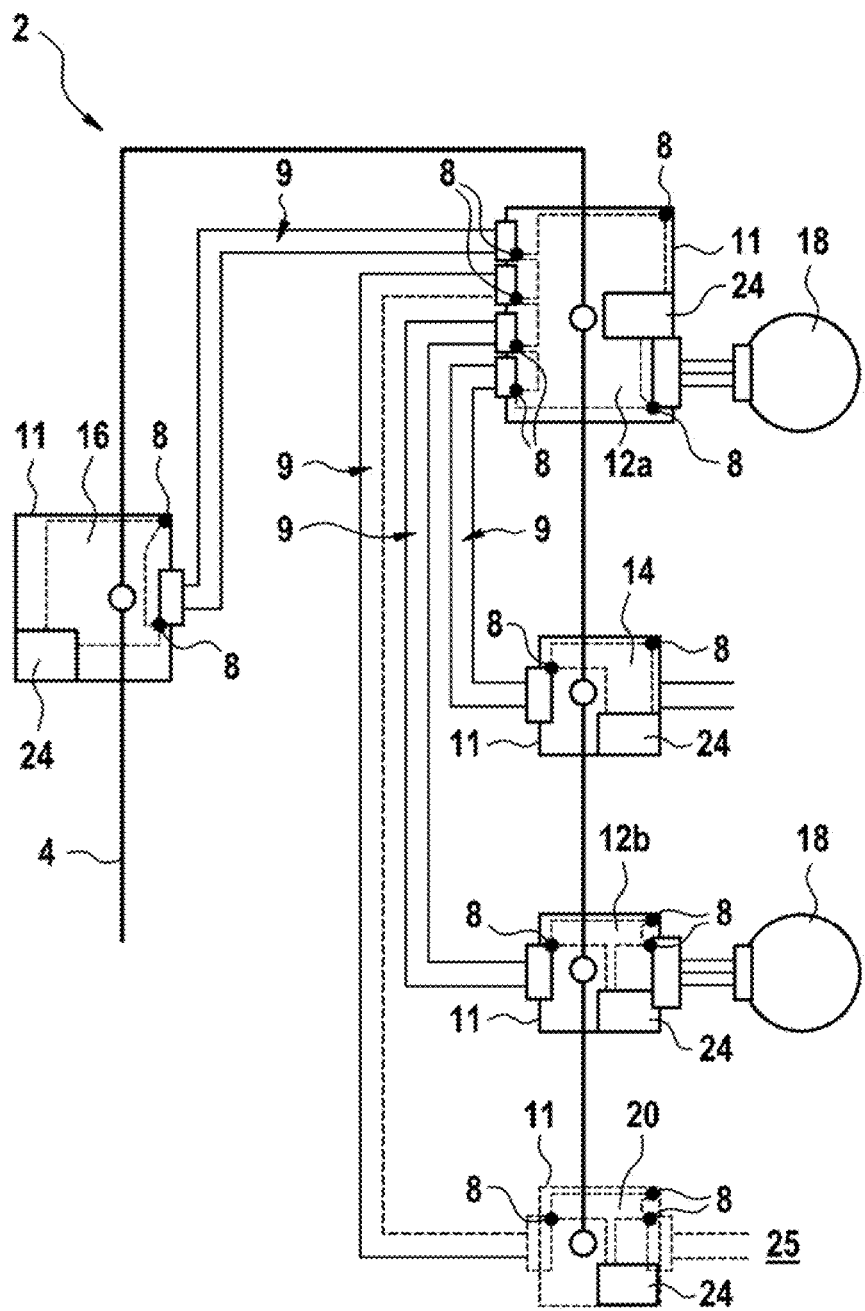
FIG. 3 shows a further exemplary embodiment of a high-voltage system according to the present invention.

A further exemplary embodiment of a high-voltage system according to the present invention is illustrated with further reference to FIG. 3.

The basic design and the interconnection of the components according to FIG. 3 correspond substantially to those in FIG. 2, wherein, in accordance with FIG. 3, each component 12a, 12b, 14, 16, 20 and possibly 18 has local detection contacts 8 and a local evaluation circuit 24 which is designed to identify detection of opening of a detection contact 8. In this case, detection contacts 8 are arranged, by way of example, both on the connection elements of the high-voltage line 9 and on the housing 11 of the respective component. By way of example, local detection of this kind can also be realized using a serial interconnection of the detection contacts 8, as illustrated in FIG. 3.

If one of the detection contacts 8 is now triggered, for example interrupted, the evaluation circuit 24 evaluates the interruption as the need to carry out high-voltage disconnection of the system 2. To this end, the evaluation circuit 24 accesses data bus 4 in order to inform the respective other elements of the system 2 about the need for high-voltage disconnection and to there locally trigger the system reaction for disconnecting the respective high-voltage-carrying component.

Therefore, in the case of the components 12a, 12b, 14 and 16, a contact may be opened when the housing is opened or when a high-voltage plug is removed, said contact being monitored by means of the local evaluation circuit 24. Emergency disconnection of the high-voltage circuit is initiated by means of the data bus 4 in the event of triggering. In the case of the charging device 20, detection of the removal of the plug of the public electricity supply system 25 may also be monitored, wherein this does not necessarily have to result in emergency disconnection.

The electrical machines 18 can be secured and connected to the pulse-controlled inverters 12a, b by the respective plugs either being secured by installation or riveted, or in some other way such that they can be opened only by being destroyed, or else the housing of the machine may be opened only when the plug has been withdrawn or disconnected.

As an alternative, the housing and plug of the electrical machine 18 can be monitored by means of the evaluation circuit 24 and associated detection contact 8 of the respective pulse-controlled inverter 12a, b.

A detection contact 8 can also be arranged, for example, in such a way that the corresponding detection contact 8 triggers emergency disconnection of the hazardous voltage when the data bus plug is removed from the respective component 12a, b, 14, 16, 20 and possibly 18.

In order to increase the redundancy and operational reliability, a refinement which corresponds substantially to a combination of the systems 2 according to FIG. 2 and FIG. 3 may also be feasible.

Figure 4:
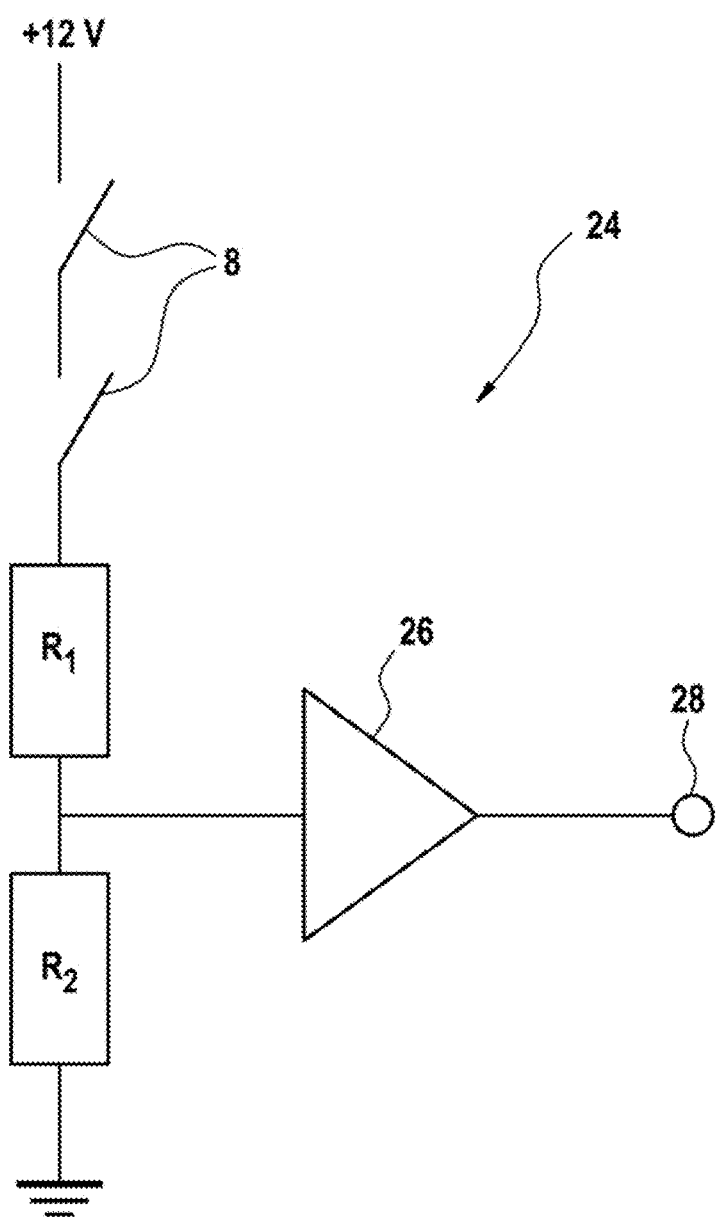
FIG. 4 shows an exemplary embodiment of an evaluation circuit according to the present invention.

An exemplary embodiment of an evaluation circuit according to the present invention is illustrated with further reference to FIG. 4.

The evaluation circuit 24 is realized, by way of example, using an operational amplifier, for example a Schmitt trigger 26, which is connected to a supply voltage, for example 12 V, via a voltage divider comprising the resistors $R_1$ and $R_2$ and one or more detection contacts 8 or monitoring contacts in such a way that the operational amplifier 26 forwards a detection signal to an input, for example a digital input 28, of a monitoring system in the event of a detection contact 8 being opened.

Figure 5:
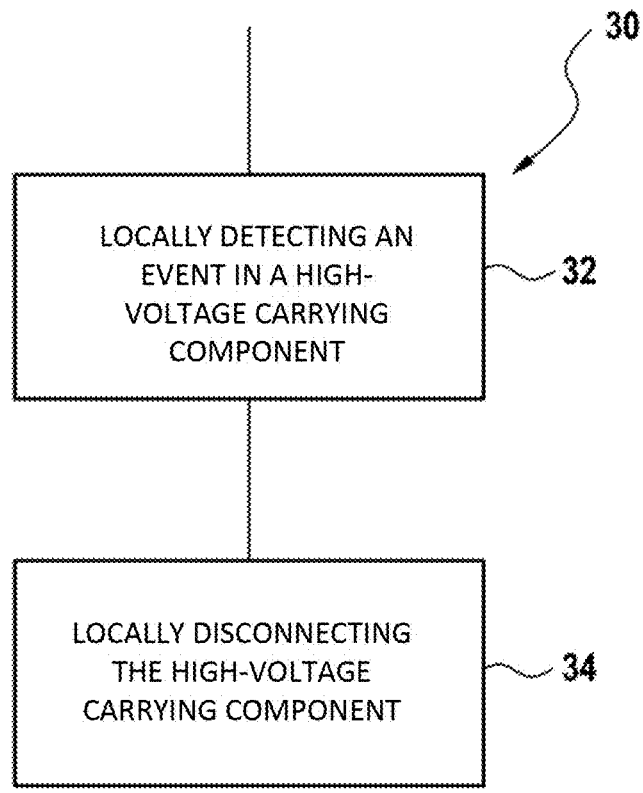
FIG. 5 shows an exemplary flowchart of a method for high-voltage disconnection in a vehicle according to the present invention.

An exemplary flowchart of a method for high-voltage disconnection in a vehicle according to the present invention is illustrated with further reference to FIG. 5.

FIG. 5 shows a method 30 for high-voltage disconnection in a vehicle having at least one high-voltage-carrying component, comprising the step of locally detecting 32 an event in a high-voltage-carrying component, which event is intended to trigger high-voltage disconnection, wherein the event is disconnection of a connection element of the data bus 4 from the high-voltage-carrying component; characterized by the step of locally triggering 34 high-voltage disconnection of the high-voltage-carrying component in the vehicle, wherein electric-shock protection of the high-voltage-carrying component 10, 12a, b, 14, 16, 18, 20 can only be reduced after the connection element of the data bus 4 is disconnected from the high-voltage-carrying component 10, 12a, b, 14, 16, 18, 20.

The invention claimed is:

1. A system for high-voltage disconnection in a vehicle; having at least two high-voltage-carrying components;
each component having a housing;
at least one connection element for a data bus; and at least one connection element for a high-voltage supply; wherein each high-voltage-carrying component has a detector element configured to locally detect an event, which event is intended to trigger high-voltage disconnection; characterized in that each high-voltage-carrying component is designed locally to trigger high-voltage disconnection of at least one high-voltage-carrying component in response to the detection of the event,
wherein the high-voltage-carrying components are coupled such that they can communicate using the data bus; and
wherein upon detection of an event, an evaluation circuit of the high-voltage-carrying component informs the other high-voltage-carrying components of the event which triggers local high-voltage disconnection in the other high-voltage-carrying components.

2. The system as claimed in claim 1, wherein the event is an event from the group comprising disconnecting the connection element of the data bus from the high-voltage-carrying component, breakdown of or disturbance in the data bus, interruption of a local pilot line/high-voltage interlock line when opening the housing of the high-voltage-carrying component, and triggering of the local detector element of the high-voltage-carrying component.

3. The system as claimed in claim 1,
wherein at least one high-voltage-carrying component is formed in such a way that the housing can only be opened after the connection element of the data bus is disconnected from the high-voltage-carrying component; and/or
that the connection element of a high-voltage line can only be disconnected after the connection element of the data bus is disconnected from the high-voltage-carrying component; and/or
electric-shock protection of the high-voltage-carrying components can only be reduced after the connection element of the data bus is disconnected from the high-voltage-carrying component.

4. The system as claimed in claim 1,
wherein the detector element is a constituent part of the connection element of the data bus; and
wherein each high-voltage-carrying component triggers the response of the system by communication using the data bus after detection of the event.

5. The system as claimed in claim 1,
wherein the high-voltage-carrying component is a component from the group comprising pulse-controlled inverter, battery, electrical machine, charging device, on-board electrical system distributor and DC voltage converter; and
wherein disconnection of the high-voltage involves deactivating feeding sources, deactivating electrical drives and discharging energy storage devices.

6. The system as claimed in claim 1,
wherein the event is disconnection of a connection element of the data bus from the high-voltage-carrying component; and
wherein at least one high-voltage-carrying component is formed in such a way that electric-shock protection of the high-voltage-carrying components can only be reduced after the connection element of the data bus is disconnected from the high-voltage-carrying component.

7. A vehicle having a system as claimed in claim 1.

8. The system as claimed in claim 1, wherein the data bus is at least one of CAN bus, LIN and flexray.

9. The system as claimed in claim 1, wherein at least one high-voltage-carrying component is formed in such a way that the housing can only be opened after the connection element of the data bus is disconnected from the high-voltage-carrying component.

10. The system as claimed in claim 1, wherein at least one high-voltage-carrying component is formed in such a way that the connection element of a high-voltage line can only be disconnected after the connection element of the data bus is disconnected from the high-voltage-carrying component.

11. The system as claimed in claim 1, wherein at least one high-voltage-carrying component is formed in such a way electric-shock protection of the high-voltage-carrying components can only be reduced after the connection element of the data bus is disconnected from the high-voltage-carrying component.

12. The system as claimed in claim 1, wherein the detector element is a constituent part of the connection element of the data bus.

13. The system as claimed in claim 1, wherein each high-voltage-carrying component triggers the response of the system by communication using the data bus after detection of the event.

14. The system as claimed in claim 1, wherein the high-voltage-carrying component is a component from the group comprising pulse-controlled inverter, battery, electrical machine, charging device, onboard electrical system distributor and DC voltage converter.

15. The system as claimed in claim 1, wherein disconnection of the high-voltage involves deactivating feeding sources, deactivating electrical drives and discharging energy storage devices.

16. The vehicle as claimed in claim 7, wherein the vehicle is an electric vehicle.

17. The vehicle as claimed in claim 7, wherein the vehicle is a hybrid vehicle.

\* \* \* \* \*